(12) United States Patent
Wiedmann

(10) Patent No.: US 11,221,011 B2
(45) Date of Patent: Jan. 11, 2022

(54) RADIAL COMPRESSOR SHAFT HAVING AN AIR COOLING CAVITY

(71) Applicant: Robert Bosch GmbH, Stuttgart (DE)

(72) Inventor: Felix Wiedmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 16/634,203

(22) PCT Filed: Jun. 20, 2018

(86) PCT No.: PCT/EP2018/066426
§ 371 (c)(1),
(2) Date: Jan. 27, 2020

(87) PCT Pub. No.: WO2019/020290
PCT Pub. Date: Jan. 31, 2019

(65) Prior Publication Data
US 2020/0158124 A1  May 21, 2020

(30) Foreign Application Priority Data

Jul. 26, 2017 (DE) .................... 10 2017 212 817.8

(51) Int. Cl.
*F04D 29/053* (2006.01)
*F04D 25/06* (2006.01)
(Continued)

(52) U.S. Cl.
CPC ........... *F04D 29/053* (2013.01); *F04D 25/06* (2013.01); *F04D 29/054* (2013.01);
(Continued)

(58) Field of Classification Search
CPC .. F04D 29/045; F04D 29/054; F04D 29/0405; F05B 2240/61; Y10T 464/10; F16D 2300/0212
(Continued)

(56) References Cited

U.S. PATENT DOCUMENTS 2,969,908 A * 1/1961 Dallenbach .......... F04D 25/0606
                                                        417/423.1
3,267,868 A * 8/1966 Page ..................... F04D 29/588
                                                        417/370
(Continued)

FOREIGN PATENT DOCUMENTS

CN         101109389 A    1/2008
CN         202001382 U   10/2011
(Continued)

OTHER PUBLICATIONS

International Search Report for Application No. PCT/EP2018/066426 dated Sep. 28, 2018 (English Translation, 3 pages).

*Primary Examiner* — Nathan C Zollinger
*Assistant Examiner* — Timothy P Solak
(74) *Attorney, Agent, or Firm* — Michael Best & Friedrich LLP

(57) ABSTRACT

The invention relates to a shaft for supplying air to a fuel cell, comprising a tubular body (12), at least sections of which are hollow, and which has a first component (14) and a second component (16) that are connected to one another at respective neighbouring axial end sections (14a, 16a), and wherein air can flow through a hollow space (12a) of the tubular body (12) for cooling components arranged next to the shaft (10). The invention also relates to a radial compressor (1). The invention further relates to a method for producing a radial compressor (1).

14 Claims, 2 Drawing Sheets

(51) Int. Cl.
  *F04D 29/58* (2006.01)
  *F04D 29/054* (2006.01)
  *F04D 29/044* (2006.01)

(52) U.S. Cl.
  CPC ....... *F04D 29/584* (2013.01); *F04D 29/5806* (2013.01); *F04D 29/044* (2013.01); *F05B 2240/61* (2013.01); *F16D 2300/0212* (2013.01)

(58) Field of Classification Search
  USPC .......................................................... 415/155
  See application file for complete search history.

(56) References Cited

U.S. PATENT DOCUMENTS

| | | | | | |
|---|---|---|---|---|---|
| 5,443,207 | A | * | 8/1995 | Genga | F04D 13/0606 237/8 R |
| 5,494,413 | A | * | 2/1996 | Campen | F04D 3/005 417/356 |
| 2010/0196141 | A1 | * | 8/2010 | Eybergen | F04D 25/06 415/124.2 |
| 2016/0123344 | A1 | * | 5/2016 | Griffin | F04D 7/00 416/171 |
| 2016/0223030 | A1 | * | 8/2016 | Dunning | B60C 23/003 |

FOREIGN PATENT DOCUMENTS

| | | |
|---|---|---|
| CN | 202709409 U | 1/2013 |
| CN | 105673088 A | 6/2016 |
| DE | 545628 | 3/1932 |
| DE | 102013221119 | 5/2015 |
| DE | 102015016607 | 8/2016 |
| EP | 2011967 | 1/2009 |
| GB | 369104 A | 3/1932 |
| JP | 2003301799 A | 10/2003 |
| WO | 2007072536 | 6/2007 |
| WO | 2009156286 | 12/2009 |
| WO | 2012045531 A1 | 4/2012 |
| WO | 2016091348 | 6/2016 |

\* cited by examiner

RADIAL COMPRESSOR SHAFT HAVING AN AIR COOLING CAVITY

BACKGROUND OF THE INVENTION

The invention relates to a shaft for a radial compressor for the air supply of a fuel cell. Furthermore, the invention relates to a radial compressor for the air supply of a fuel cell. Moreover, the invention relates to a method for producing a radial compressor for the air supply of a fuel cell.

Electrically driven turbo compressors which serve for the air supply of a fuel cell are considered to be known. The power is generated in the fuel cell in the vehicle itself, by the hydrogen from the tank reacting with the oxygen from the ambient air. Power is generated in the process and merely water vapor is produced as a reaction product. Air and hydrogen have to be fed to the fuel cell in the correct ratio by way of auxiliary units. A pressure increase in the air leads to an increase in the degree of efficiency and the power density. In order to reduce costs, storage batteries are largely dispensed with in current concepts, with the result that the fuel cell has to provide its energy dynamically, in a manner which corresponds to the requirement of the traction drive. This also necessitates highly transient operation of the air supply.

DE 10 2013 221 119 A1 discloses a radial compressor having an air impeller for transporting and for compressing air, an air blade of the air impeller being shaped at a radial end so as to form a radial air bearing with a housing which encloses the air impeller for mounting the air impeller.

SUMMARY OF THE INVENTION

The present invention provides a shaft for a radial compressor for the air supply of a fuel cell, having a tubular body which is of hollow configuration at least in sections and has a first component and a second component which are connected to one another on the respective axial end sections which are arranged adjacently with respect to one another, and it being possible for air to flow through a cavity of the tubular body in order to cool components which are arranged adjacently with respect to the shaft.

Furthermore, the present invention provides a radial compressor for the air supply of a fuel cell, with a running gear having the shaft according to the invention, to which at least one compressor impeller is flange-connected, and with an electric motor which is configured to drive the shaft.

Moreover, the invention provides a method for producing a radial compressor for the air supply of a fuel cell. The method for producing a radial compressor for the air supply of the fuel cell comprises providing of a tubular body which has a first component and a second component. Furthermore, the method comprises making of a bore which is stepped at least in sections in the first component and in the second component. Furthermore, the method comprises connecting of the first component and the second component on respective axial end sections of the first component and of the second component, which axial end sections are arranged adjacently with respect to one another, it being possible for air to flow through a cavity of the tubular body which is of hollow configuration at least in sections in order to cool components which are arranged adjacently with respect to the shaft.

It is one concept of the present invention to configure a cavity of the tubular body in accordance with structural specifications and/or requirements by way of the provision of an assembled shaft having the first component and the second component which are connected to one another on axial end sections. Furthermore, air can flow through the cavity of the tubular body in order to cool components which are arranged adjacently with respect to the shaft, as a result of which said tubular body can firstly be optimized in terms of weight by way of the provision of the cavity, and secondly provides a cooling air supply of the corresponding components.

Advantageous embodiments and developments result from the subclaims and from the description with reference to the figures.

It is provided in accordance with one preferred development that the first component and the second component are connected to one another by way of friction welding.

This can ensure a simple production capability of the shaft. The connection of the first component and the second component can take place precisely in an advantageous way, as a result of which a running behavior of the shaft is superior to that of a solid shaft on account of the hollow configuration.

It is provided in accordance with a further preferred development that, on a first axial end section which is arranged adjacently with respect to a connecting point of the first component to the second component, the first component has a bore of a first diameter which extends in the axial direction of the first component and is adjoined by a section of variable diameter which is adjoined by a bore of a second diameter which extends in the axial direction of the first component. A configuration of this type of the cavity of the first component can be realized in an advantageous way merely by way of the splitting of the shaft into a first component and a second component. In this way, the cavity can substantially follow or be adapted to an outer contour of the shaft.

It is provided in accordance with a further preferred development that, on a first axial end section which is arranged adjacently with respect to a connecting point of the second component to the first component, the second component has a bore of a first diameter which extends in the axial direction of the second component and is adjoined by a section of variable diameter which is adjoined by a bore of a second diameter which extends in the axial direction of the second component.

A configuration of this type of the cavity of the second component can be realized in an advantageous way merely by way of the splitting of the shaft into a first component and a second component. In this way, the cavity can substantially follow or be adapted to an outer contour of the shaft.

It is provided in accordance with a further preferred development that the bore of a first diameter of the first component and of the second component has a smaller diameter than the bore of a second diameter of the first component and of the second component, the section of variable diameter which is made in the first component and the second component being configured in such a way that the diameter increases in a substantially linear manner from the first bore to the second bore. In this way, a laminar air flow can be conducted through the tubular body in an advantageous way, without eddys occurring at points of changes in the diameter.

It is provided in accordance with a further preferred development that, on a second axial end section which is arranged adjacently with respect to a compressor impeller, the first component has a central bore which is arranged in the region of a center longitudinal axis of the first component, extends in the axial direction of the first component, and communicates fluidically with the bore of a second diameter which is made in the first component. By way of the provision of the transverse bore, the air which flows into the tubular body can be discharged to a surrounding area.

It is provided in accordance with a further preferred development that air which flows into the cavity of the tubular body through the central opening can be conducted through the cavity of the tubular body, it being possible for the air to flow out of the cavity of the tubular body through the transverse bore which is arranged in the region of the second bore of the second component. The transverse bore is arranged in an advantageous way such that an air flow which exits from it loads components which are arranged adjacently with respect to the shaft with the air flow, in order thus to bring about cooling of the components.

It is provided in accordance with a further preferred development that the cavity of the tubular body has an air guiding element which is configured to deflect an air flow from an axial flow into a radial flow and to feed it to the transverse bore. In this way, the air flow which is conducted through the tubular body can be fed efficiently to the transverse bore.

It is provided in accordance with a further preferred development that a rotation of the shaft generates a pumping action for the ejection of the air through at least one transverse bore which is arranged in the cavity of the tubular body and communicates with the surrounding area of the shaft. Therefore, the rotation of the shaft brings about an acceleration of the air flow in an advantageous way, with the result that the components which are arranged adjacently with respect to the shaft can be loaded effectively with the air flow.

The described refinements and developments can be combined with one another in any desired manner.

Further possible refinements, developments and implementations of the invention also comprise combinations which have not been mentioned explicitly of features of the invention which are described in the above text or will be described in the following text with regard to the exemplary embodiments.

BRIEF DESCRIPTION OF THE DRAWINGS

The appended drawings are intended to impart further understanding of the embodiments of the invention. They illustrate embodiments and, in conjunction with the description, serve to describe principles and concepts of the invention.

Other embodiments and many of the mentioned advantages result with regard to the drawings. The illustrated elements of the drawings are not necessarily shown to scale with respect to one another.

In the drawings:

FIG. 1 shows a longitudinal sectional view of a shaft for a radial compressor in accordance with one preferred embodiment of the invention; and FIG. 2 shows a flow chart of a method for producing a radial compressor in accordance with the preferred embodiment of the invention.

DETAILED DESCRIPTION

In the figures of the drawings, identical designations denote identical or functionally identical elements, structural parts or components unless indicated otherwise.

Figure 1:
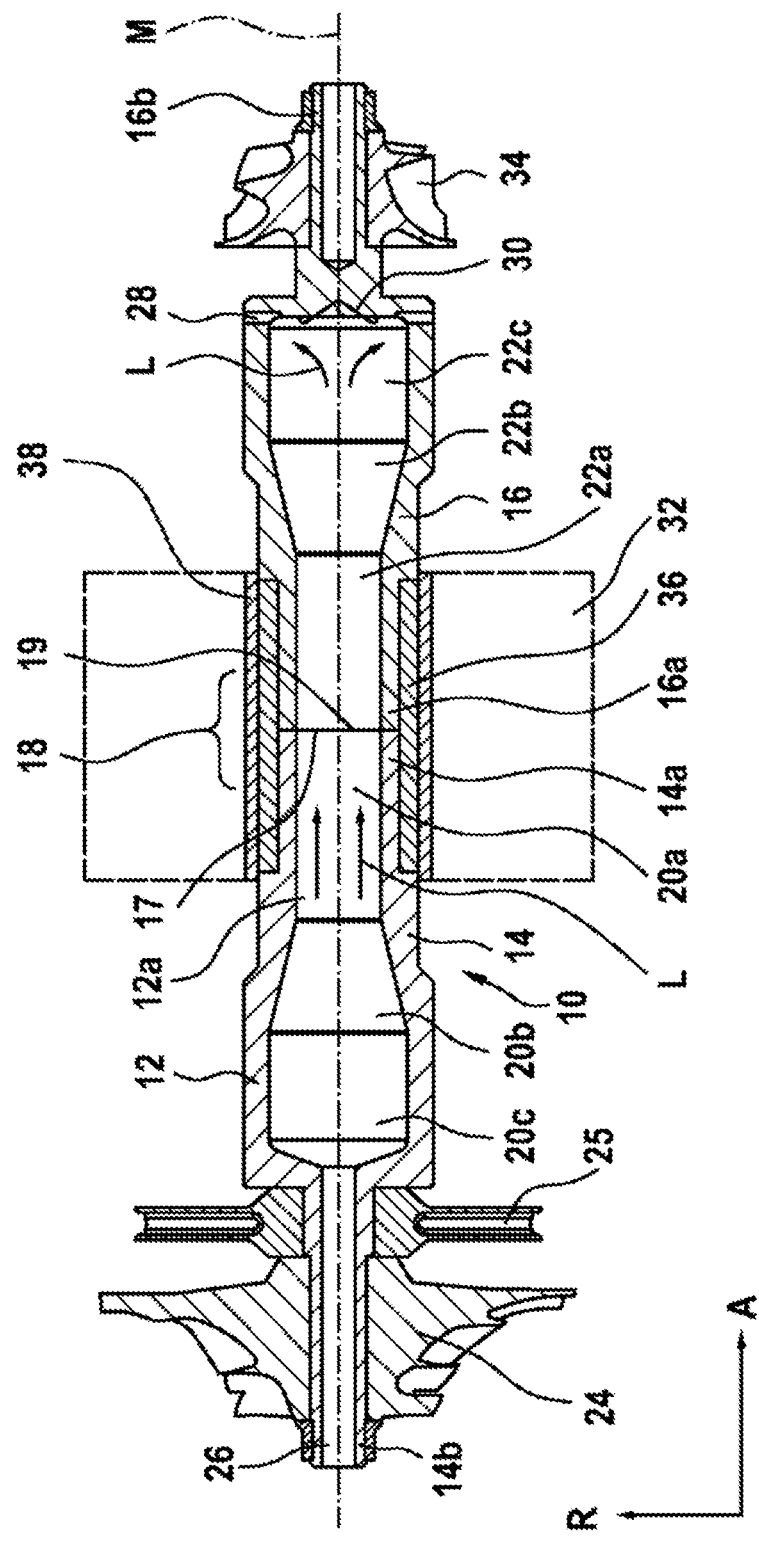

FIG. 1 shows a longitudinal sectional view of a shaft for a radial compressor in accordance with one preferred embodiment of the invention.

The shaft 10 for the radial compressor 1 for the air supply of a fuel cell has a tubular body 12 which is of hollow configuration at least in sections. The tubular body 12 has a first component 14 and a second component 16 which are connected to one another on respective axial end sections 14a, 16a which are arranged adjacently with respect to one another. Air can flow through a cavity 12a of the tubular body 12 in order to cool components which are arranged adjacently with respect to the shaft 10. The components are configured, for example, by way of an electric motor 32 and/or a bearing of the shaft.

The first component 14 and the second component 16 are preferably connected to one another by way of friction welding. As an alternative, the first component 14 and the second component 16 can be connected to one another by way of a conventional welded connection or another joint. A friction welded seam 17 is configured substantially in the radial direction R of the shaft 10 and in a substantially central region 18 in the axial direction A of the shaft 10.

On a first axial end section 14a which is arranged adjacently with respect to a connecting point 19 of the first component 14 to the second component 16, the first component 14 has a bore 20a of a first diameter which extends in the axial direction A of the first component 14. The bore 20a of a first diameter is adjoined by a section 20b of variable diameter. In turn, the section 20b of variable diameter is adjoined by a bore 20c of a second diameter which extends in the axial direction A of the first component 14.

The bore 20a of a first diameter of the first component 14 has a smaller diameter than the bore 20c of the second diameter of the first component 14. The section 20b of variable diameter which is made in the first component 14 is configured in such a way that the diameter increases in a substantially linear manner from the first bore 20a to the second bore 20c.

On a first axial end section 16a which is arranged adjacently with respect to a connecting point 19 of the second component 16 to the first component 14, the second component 16 has a bore 22a of a first diameter which extends in the axial direction A of the second component 16. The bore 22a of a first diameter is adjoined by a section 22b of variable diameter. In turn, the section 22b of variable diameter is adjoined by a bore 22c of the second diameter which extends in the axial direction A of the second component 16.

The bore 22a of a first diameter of the second component 16 has a smaller diameter than the bore 22c of the second diameter of the second component 16. The section 22b of variable diameter which is made in the second component 16 is configured in such a way that the diameter increases in a substantially linear manner from the first bore 22a to the second bore 22c. On a second axial end section 14b which is arranged adjacently with respect to a compressor impeller 24, the first component 14 has a central bore 26 which is arranged in the region of a center longitudinal axis M of the first component 14. The central bore 26 extends in the axial direction A of the first component 14 and communicates fluidically with the bore 20c of the second diameter which is made in the first component 14.

The tubular body 12 has a transverse bore 28 which is preferably arranged so as to run around the tubular body 12. The transverse bore 28 is arranged in the region of the bore 22c of the second diameter of the second component 16, and communicates fluidically with the bore 22c of the second diameter of the second component 16.

Air which flows into the cavity 12a of the tubular body 12 through the central opening 26 can be conducted through the cavity 12a of the tubular body 12. Here, the air can flow out of the cavity 12a of the tubular body 12 through the transverse bore 28 which is arranged in the region of the bore 22c of a second diameter of the second component 16.

The cavity 12a of the tubular body 12 has an air guiding element 30. The air guiding element 30 is configured to deflect an air flow L from an axial flow into a radial flow and to therefore feed it to the transverse bore.

A compressor impeller 24 is arranged on the shaft 10 in the region of the central opening 26 or the second axial end section 14b of the first component 14. Furthermore, an axial bearing 25 is arranged between the compressor impeller 24 and the tubular body 12. Moreover, a turbine impeller 34 is flange-connected to a second axial end section 16b of the second component 16. The turbine impeller 34 is optional. Moreover, a permanent magnet 36 of the electric motor 32 for driving the shaft 10 is arranged in the central region 18. The permanent magnet 36 is fixed positionally by a tie bar 38 made from steel or carbon, for example.

Figure 2:
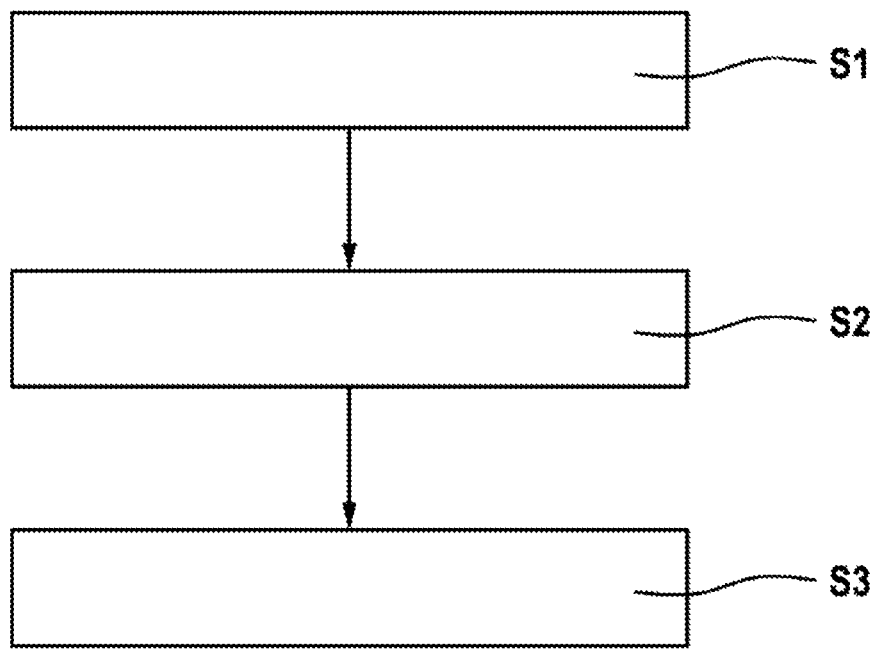

FIG. 2 shows a flow chart of a method for producing a radial compressor in accordance with the preferred embodiment of the invention. The method for producing a radial compressor for the air supply of the fuel cell comprises providing S1 of the tubular body which has a first component and a second component.

Furthermore, the method comprises making S2 of a bore which is stepped at least in sections in the first component and in the second component.

Furthermore, the method comprises connecting S3 of the first component and the second component on respective axial end sections of the first component and the second component, which axial end sections are arranged adjacently with respect to one another, it being possible for air to flow through a cavity of the tubular body which is of hollow configuration at least in sections in order to cool components which are arranged adjacently with respect to the shaft.

Although the present invention has been described in the preceding text on the basis of preferred exemplary embodiments, it is not restricted thereto, but rather can be modified in a wide variety of ways. In particular, the invention can be amended or modified in various ways, without departing from the core concept of the invention.

For example, a shape, dimension and/or composition of the components of the shaft can be modified in accordance with respective design and/or structural requirements.

The invention claimed is:

1. A shaft (10) for a radial compressor (1) for the air supply of a fuel cell, the shaft (10) having a tubular body (12) which is of hollow configuration at least in sections and has a first component (14) and a second component (16) which are connected to one another on respective first axial end sections (14a, 16a) arranged adjacently with respect to one another, the shaft (10) being configured to allow air to flow through a cavity (12a) of the tubular body (12) in order to cool components which are arranged adjacently with respect to the shaft (10);
wherein the first component (14) includes a first bore (20a) at the first axial end section (14a) of the first component (14), the first bore (20a) having a first diameter and extending in an axial direction (A), a second bore (20c) having a second diameter greater than the first diameter and extending in the axial direction (A), and a section (20b) disposed axially between the first bore (20a) and the second bore (20c) and having a diameter that increases in a linear manner from the first bore (20a) to the second bore (20c);
wherein the first component (14) further includes a central bore (26) which is arranged in a region of a center longitudinal axis (M) of the first component (14), wherein the central bore (26) extends in the axial direction (A), wherein the central bore (26) has a diameter different than the second diameter, and wherein the second bore (20c) is disposed axially between the central bore (26) and the section (20b).

2. The shaft as claimed in claim 1, characterized in that the first component (14) and the second component (16) are connected to one another by way of friction welding.

3. The shaft as claimed in claim 1, characterized in that the first axial end section (14a) of the first component is arranged adjacently with respect to a connecting point (19) of the first component (14) to the second component (16).

4. The shaft as claimed in claim 1, characterized in that, on the first axial end section (16a) of the second component which is arranged adjacently with respect to a connecting point (19) of the second component (16) to the first component (14), the second component (16) has a bore (22a) of a first diameter which extends in an axial direction (A) of the second component (16) and is adjoined by a section (22b) of variable diameter which is adjoined by a bore (22c) of a second diameter which extends in the axial direction (A) of the second component (16).

5. The shaft as claimed in claim 1, characterized in that the central bore (26) is arranged on a second axial end section (14b) of the first component (14), and extends through a compressor impeller (24).

6. The shaft as claimed in claim 1, characterized in that the tubular body (12) has a transverse bore (28) which is arranged in a region of a bore (22c) of the second component (16), and which communicates fluidically with the bore (22c) of the second component (16).

7. The shaft as claimed in claim 6, wherein the shaft (10) is configured such that air which flows into the cavity (12a) of the tubular body (12) through the central bore (26) can be conducted through the cavity (12a) of the tubular body (12), and such that the air can flow out of the cavity (12a) of the tubular body (12) through the transverse bore (28).

8. The shaft as claimed in claim 6, characterized in that the cavity (12a) of the tubular body (12) has an air guiding element (30) which is configured to deflect an air flow (L) from an axial flow into a radial flow and to feed it to the transverse bore (28).

9. The shaft as claimed in claim 8, wherein the air guiding element (30) is integrally formed as part of the second component (16).

10. A radial compressor (1) comprising the shaft (10) as claimed in claim 1, to which at least one compressor impeller (24) is coupled; and with an electric motor (32) which is configured to drive the shaft (10).

11. The shaft as claimed in claim 1, wherein the first component (14) defines an inlet for an air flow, wherein the second component (16) defines an outlet for the air flow, and wherein the central bore (26) has a diameter that is smaller than the second diameter.

12. The shaft as claimed in claim 11, further comprising a compressor impeller (24) and an axial bearing (25), wherein the first component (14) and the central bore (26) in the first component (14) each pass through both the compressor impeller (24) and the axial bearing (25), wherein the axial bearing (25) is positioned between the compressor impeller (24) and a portion of the tubular body (12).

13. The shaft as claimed in claim 12, further comprising a turbine impeller (34) coupled to an end of the second component.

14. The shaft a claimed in claim 11, wherein the first component (14) defines a region of variable diameter between the central bore (26) and the second bore (20*c*).

\* \* \* \* \*